T. F. BRYAN.
FIFTH WHEEL.

No. 171,914. Patented Jan. 11. 1876.

WITNESSES
E. F. Nottingham
Wm H. Brereton Jr

INVENTOR
Thomas F. Bryan
By Leggett & Leggett
Attorneys.

UNITED STATES PATENT OFFICE.

THOMAS F. BRYAN, OF COLUMBUS, OHIO.

IMPROVEMENT IN FIFTH-WHEELS.

Specification forming part of Letters Patent No. 171,914, dated January 11, 1876; application filed December 3, 1875.

*To all whom it may concern:*

Be it known that I, THOMAS F. BRYAN, of Columbus, in the county of Franklin and State of Ohio, have invented certain new and useful Improvements in Fifth-Wheels; and I do hereby declare the following to be a full, clear, and exact description of the invention, such as will enable others skilled in the art to which it pertains to make and use it, reference being had to the accompanying drawings, which form part of this specification.

My invention relates to a certain improvement in vehicles; and consists in a peculiar construction of the fifth-wheel.

Figure 1:
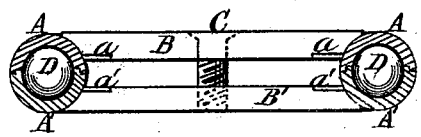
Figure 2:
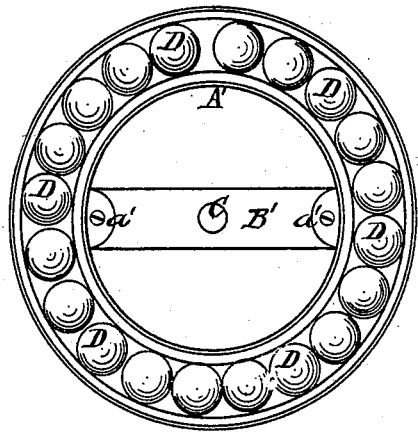
Figure 3:
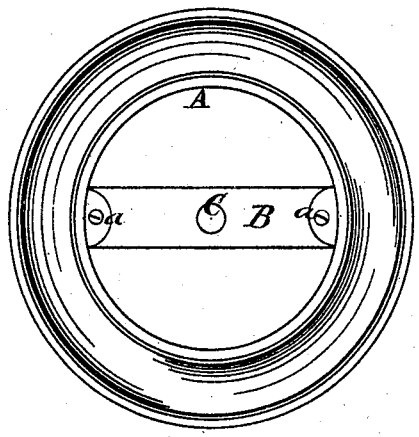

In the drawings, Figure 1 is a transverse vertical section through the fifth-wheel and king-bolt; Fig. 2, a plan view of each section or half of the fifth-wheel.

The construction of this device is readily perceived from the drawings; and consists of a top and bottom circular trough or grooved channels, A A', secured by lugs $a$ $a'$ to cross-bars B B', which bars form the bed and part of the axle of the vehicle. C is the king-bolt, passing through the bars B B', and through the axle of the vehicle, securing the parts of the fifth-wheel together, and the bed of the vehicle to the front axle. These pieces B B' may, however, be a portion of the ordinary vehicle bed-frame, and the axle and the parts of the fifth-wheel be secured by the ordinary king-bolt. The parts B B' fit snugly together, the top one slightly overlapping the lower one. Within the inclosed space between the parts are placed a number of anti-friction balls, D, on which the pressure rests, and which run loosely in the groove.

By this means an extended, rigid, and loose revolving support for a vehicle is provided, and the parts are of simple but durable construction. Much friction experienced in the old form of fifth-wheel is avoided, and a smoother and easier support obtained.

Having thus described my invention, what I claim as new, and desire to secure by Letters Patent, is—

A fifth-wheel for vehicles, consisting of an inclosing-trough composed of top and bottom channels A A' $a$ $a'$, fitting snugly together, one over the other, by lap-joint, as shown, and anti-friction metallic balls D, constructed and arranged to operate as described.

In testimony that I claim the foregoing I have hereunto set my hand.

THOMAS F. BRYAN.

Witnesses:
  JAMES WATSON,
  W. H. UPTON.